United States Patent
Gregg

(10) Patent No.: US 7,617,340 B2
(45) Date of Patent: *Nov. 10, 2009

(54) I/O ADAPTER LPAR ISOLATION WITH ASSIGNED MEMORY SPACE

(75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/621,334

(22) Filed: Jan. 9, 2007

(65) Prior Publication Data

US 2008/0168186 A1 Jul. 10, 2008

(51) Int. Cl.
G06F 13/12 (2006.01)
G06F 13/00 (2006.01)

(52) U.S. Cl. .......................................... 710/62; 710/33
(58) Field of Classification Search .................. 710/62, 710/33
See application file for complete search history.

(56) References Cited

U.S. PATENT DOCUMENTS

| | | | |
|---|---|---|---|
| 5,497,490 | A | 3/1996 | Harada et al. |
| 6,002,883 | A | 12/1999 | Goldrian |
| 6,311,255 | B1 | 10/2001 | Sadana |
| 6,523,140 | B1 * | 2/2003 | Arndt et al. ................... 714/44 |
| 6,721,816 | B1 | 4/2004 | Magro et al. |
| 7,007,125 | B2 | 2/2006 | Barker et al. |
| 7,225,287 | B2 * | 5/2007 | Wooten ....................... 710/309 |
| 7,363,404 | B2 | 4/2008 | Boyd et al. |
| 2002/0152335 | A1 * | 10/2002 | Holm et al. ..................... 710/8 |
| 2002/0194437 | A1 * | 12/2002 | Kapoor et al. .............. 711/153 |
| 2003/0145136 | A1 | 7/2003 | Tierney et al. |
| 2003/0172322 | A1 * | 9/2003 | Kitamorn et al. .............. 714/43 |
| 2003/0236852 | A1 | 12/2003 | Fernandes et al. |
| 2004/0030712 | A1 | 2/2004 | Sano et al. |
| 2004/0210817 | A1 | 10/2004 | Kapoor et al. |
| 2006/0010276 | A1 * | 1/2006 | Arndt et al. .................. 710/305 |
| 2006/0010355 | A1 * | 1/2006 | Arndt et al. .................... 714/56 |
| 2006/0064523 | A1 | 3/2006 | Moriki et al. |
| 2006/0179195 | A1 | 8/2006 | Sharma et al. |
| 2006/0195675 | A1 | 8/2006 | Arndt et al. |
| 2007/0136554 | A1 * | 6/2007 | Biran et al. .................. 711/203 |
| 2007/0168636 | A1 | 7/2007 | Hummel et al. |
| 2007/0168641 | A1 | 7/2007 | Hummel et al. |
| 2007/0168644 | A1 | 7/2007 | Hummel et al. |
| 2008/0147891 | A1 | 6/2008 | Gregg |

(Continued)

OTHER PUBLICATIONS

Advanced Micro Devices, PID 34434 Rev. 1.00—Feb. 3, 2006, 'AMD I/O Virtualization Technology (IOMMU) Specification, pp. 1-52.

Primary Examiner—Henry W. H. Tsai
Assistant Examiner—Hyun Nam
(74) Attorney, Agent, or Firm—Arthur Ortega

(57) ABSTRACT

A data processing system and method of isolating a plurality of I/O adapters in the system. The data processing system also comprises a set of processors communicating with the I/O adapters using a PCIe protocol. Each of the I/O adapters has a respective ID. In the preferred embodiment the commands issued by the I/O adapters include a PCIe defined Requestor ID field including one or more of the Requestor IDs of I/O Adapters. The Req IDs can be used as an input to a CAM which provides an index to a TVT to identify a unique and independent system memory space for the I/O adapter.

7 Claims, 6 Drawing Sheets

U.S. PATENT DOCUMENTS

2008/0168186 A1 7/2008 Gregg
2008/0168207 A1 7/2008 Gregg
2008/0168208 A1 7/2008 Gregg

* cited by examiner

MOVING ISOLATION FUNCTIONS TOWARDS THE PROCESSOR

I/O ADAPTER LPAR ISOLATION WITH ASSIGNED MEMORY SPACE

CROSS REFERENCE TO RELATED APPLICATIONS

U.S. patent application Ser. No. 11/621,279, entitled "I/O Adapter LPAR Isolation in a Hypertransport Environment Employing a Content Addressable Memory", and Ser. No. 11/621,314, entitled "I/O Adapter LPAR Isolation in a Hypertransport Environment with Assigned Memory Space Indexed via a TVT and Unit IDs", filed concurrently herewith are assigned to the same assignee hereof, International Business Machines Corporation of Armonk, N.Y., and contain subject matter related, in certain respect, to the subject matter of the present application. U.S. patent application Ser. No. 11/550,618, entitled "I/O Adapter LPAR Isolation in a Hypertransport Environment" filed Oct. 18, 2006, and assigned to the same assignee hereof, also contains subject matter related, in certain respect, to the subject matter of the present application. The above-identified patent applications are incorporated herein by reference in their entirety.

BACKGROUND OF THE INVENTION

1. Field of the Invention

This invention generally relates to isolating input/output adapter addressing domains in a data processing system. More specifically, the invention relates to isolating input/output adapter addressing domains in a logically partitioned data processing system implementing HyperTransport. The term "isolation", as used herein, refers to verifying that an I/O adapter actually owns or has the right to access particular system memory locations for which it is requesting access. Thus, if an I/O adapter is properly isolated to a preassigned memory space, it will only request access to that area of memory.

2. Background Art

In a logically partitioned data processing system, multiple operating systems or multiple copies of a single operating system are run on a single data processing system platform. Each operating system or operating system copy executing within the data processing system is assigned to a different logical partition ("LPAR"), and each partition is allocated a non-overlapping subset of the resources of the platform. Thus, each operating system or operating system copy directly controls a distinct set of allocatable resources within the platform.

Among the platform resources that may be allocated to different partitions are processors or time slices of processors, regions of system memory, and I/O Adapters ("IOAs") or parts of IOAs. Thus, different regions of system memory and different IOAs or parts of IOAs may be assigned to different partitions, i.e. each IOA is "owned" by a partition. In such an environment, it is important that the platform provide a mechanism to enable IOAs or parts of IOAs to obtain access to all the physical memory that they require to properly service the partition or partitions to which they have been assigned; while, at the same time prevent IOAs or parts of IOAs from obtaining access to physical memory that has not been allocated to their associated partitions.

In a logically partitioned data processing system, various communication technologies may be used to link together the electronic devices of the system via both physical media and wirelessly. Some communication technologies interface a pair of devices, other communication technologies interface small groups of devices, and still other communication technologies interface large groups of devices.

One relatively new communication technology for coupling relatively small groups of devices is the HyperTransport (HT) technology. The HT Standard sets forth definitions for a high-speed, low-latency protocol that can interface with today's buses such as AGP, Peripheral component interconnect ("PCI"), 1394, USB 2.0, and 1 Gbit Ethernet as well as next generation buses including AGP 8×, Infiniband, PCI-X, PCI 3.0, PCIe, and 10 Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices.

HT thus offers many important advantages. Using HyperTransport attached I/O bridges in a logically partitioned data processing system, however, requires a way of isolating IOA direct memory access ("DMA") and interrupt requests to the owning LPAR.

Importantly, one LPAR could affect another through an IOA. With logical partitions, an OS in one partition cannot communicate with an OS in another partition through an IOA. For example, one OS may send commands and addresses to an IOA, and the IOA would perform DMA using these addresses. There is no mechanism to check the addresses that are provided by the OS to the IOA. Instead, the BAR/limit (and later, the translation validation table (TVT)) verifies the address when it is presented to the host by the IOA.

SUMMARY OF THE INVENTION

An object of this invention is to provide a method of and system for IOA and LPAR isolation and IOA identification.

A further object of the invention is to assign Unit IDs (HyperTransport defined) to I/O adapters, and to use the assigned Unit IDs to identify each IOA to its owning LPAR.

A further object of the invention is to assign multiple Unit-IDs to a PCIe bridge to allow multiple IOAs under the bridge or to allow multiple functions within an IOA to be individually assigned to different LPARs.

These and other objectives are obtained with a data processing system and a method of isolating a plurality of IOAs of that system. The data processing system comprises, in addition to the plurality of IOAs, a set of processors including system memory with a translation validation table ("TVT") and with a content addressable memory ("CAM"). Each of the IOAs is connected to the host bridge and has a respective identifier.

In a preferred embodiment, these identifiers are PCIe defined Requestor IDs and an innovative translation validation table (TVT) implementation for allowing each I/O Adapter to have its own memory space is described herein. The commands issued by the IOAs include a Req ID field for identifying one or more IOAs. The Req ID is used as an input to the CAM which provides an index into the TVT. The TVT specifies the unique and independent system memory space for the IOA.

These, and other, aspects and objects of the present invention will be better appreciated and understood when considered in conjunction with the following description and the accompanying drawings. It should be understood, however, that the following description, while indicating preferred embodiments of the present invention and numerous specific

DETAILED DESCRIPTION

Figure 1:
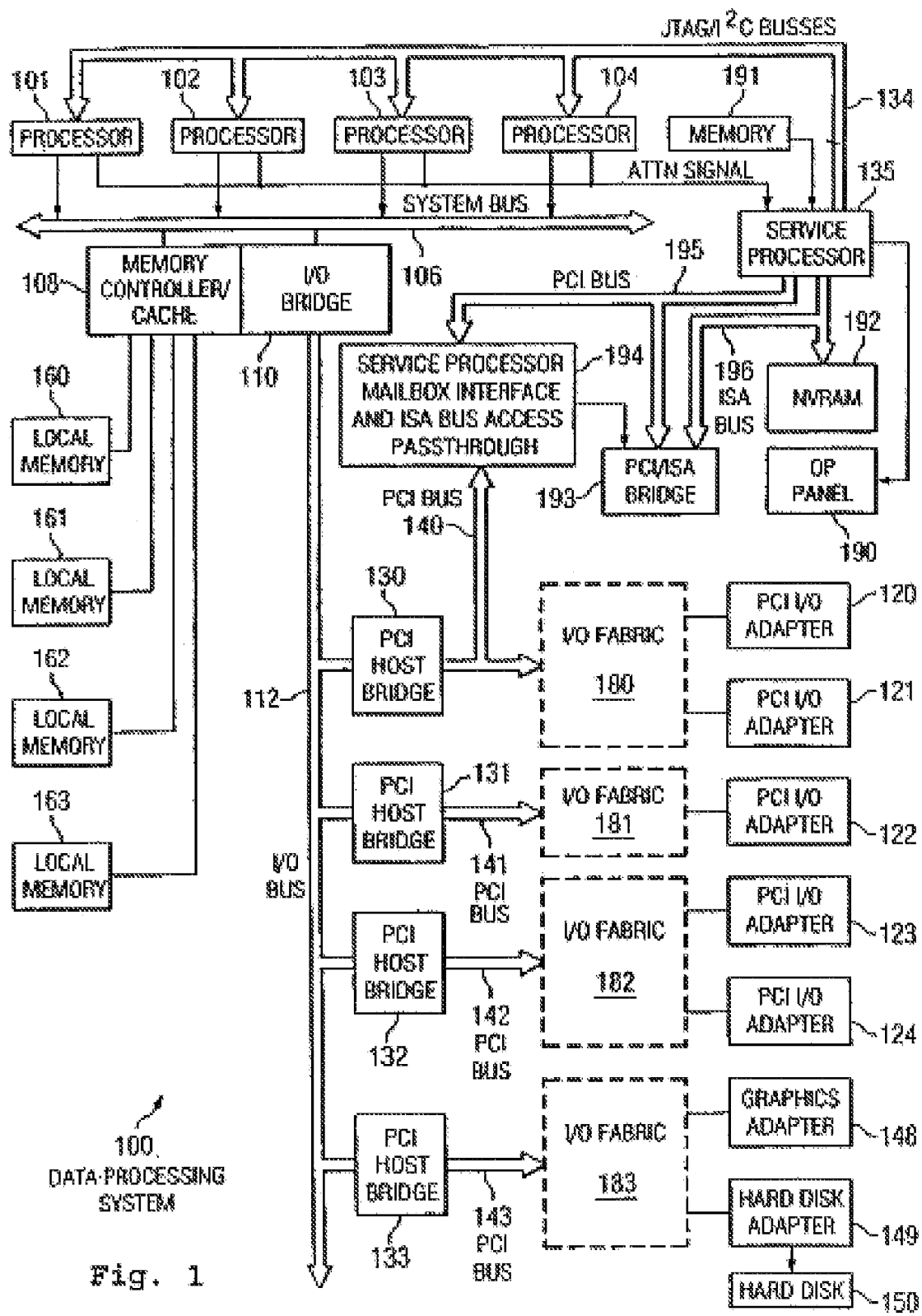
FIG. 1 is a block diagram of a data processing system in which the present invention may be implemented.

With reference now to the Figures, FIG. 1 depicts a block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may optionally be integrated.

Data processing system 100 is a logical partitioned data processing system, however, it should be understood that the invention is not limited to an LPAR system but can also be implemented in other data processing systems. LPAR data processing system 100 has multiple heterogeneous operating systems (or multiple copies of a single operating system) running simultaneously. Each of these multiple operating systems may have any number of software programs executing within it. Data processing system 100 is logically partitioned such that different PCI IOAs 120, 121, 122, 123 and 124, graphics adapter 148 and hard disk adapter 149, or parts thereof, may be assigned to different logical partitions. In this case, graphics adapter 148 provides a connection for a display device (not shown), while hard disk adapter 149 provides a connection for controlling hard disk 150.

Multiple partitions are capable of running in the same physical processor. Thus, for example, suppose data processing system 100 is divided into three logical partitions, P1, P2, and P3. Each of PCI IOAs 120-124, graphics adapter 148, hard disk adapter 149, each of host processors 101-104, and memory from local memories 160-163 is assigned to each of the three partitions. In this example, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and PCI IOAs 121, 123 and 124 may be assigned to logical partition P1; processors 102-103, some portion of memory from local memories 160-163, and PCI IOAs 120 and 122 may be assigned to partition P2; and processor 104, some portion of memory from local memories 160-163, graphics adapter 148 and hard disk adapter 149 may be assigned to logical partition P3.

Each operating system executing within a logically partitioned data processing system 100 is assigned to a different LPAR. Thus, each operating system executing within data processing system 100 may access only those IOAs that are within its logical partition. For example, one instance of the Advanced Interactive Executive ("AIX") operating system may be executing within partition P1, a second instance (copy) of the AIX operating system may be executing within partition P2, and a Linux or OS/400 operating system, for example, may be operating within logical partition P3.

PCI host bridges ("PHBs") 130, 131, 132 and 133 are connected to I/O bus 112 and provide interfaces to PCI local busses 140, 141, 142 and 143, respectively. PCI IOAs 120-121 are connected to PCI local bus 140 through I/O fabric 180, which comprises switches and bridges. In a similar manner, PCI IOA 122 is connected to PCI local bus 141 through I/O fabric 181, PCI IOAs 123 and 124 are connected to PCI local bus 142 through I/O fabric 182, and graphics adapter 148 and hard disk adapter 149 are connected to PCI local bus 143 through I/O fabric 183. The I/O fabrics 180-183 provide interfaces to PCI busses 140-143. A typical PCI host bridge will support between four and eight IOAs (for example, expansion slots for add-in connectors). Each PCI IOA 120-124 provides an interface between data processing system 100 and input/output devices such as, for example, other network computers, which are clients to data processing system 100.

PCI host bridge 130 provides an interface for PCI bus 140 to connect to I/O bus 112. This PCI bus also connects PCI host bridge 130 to the "service processor mailbox interface and ISA bus access passthrough" logic 194 and I/O fabric 180. The "service processor mailbox interface and ISA bus access passthrough" logic 194 forwards PCI accesses destined for the PCI/ISA bridge 193. NVRAM storage 192 is connected to the ISA bus 196. Service processor 135 is coupled to the "service processor mailbox interface and ISA bus access passthrough" logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips Corporation I²C busses. However, alternatively, JTAG/I²C busses 134 may be replaced by only I²C busses or only JTAG/scan busses. All SP-ATTN signals of the host processors 101, 102, 103, and 104 are connected together and to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also is capable of taking action based on the type of errors detected with respect to defined error thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads ("IPLs").

Data processing system 100 may be implemented using various commercially available computer systems. For example, data processing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
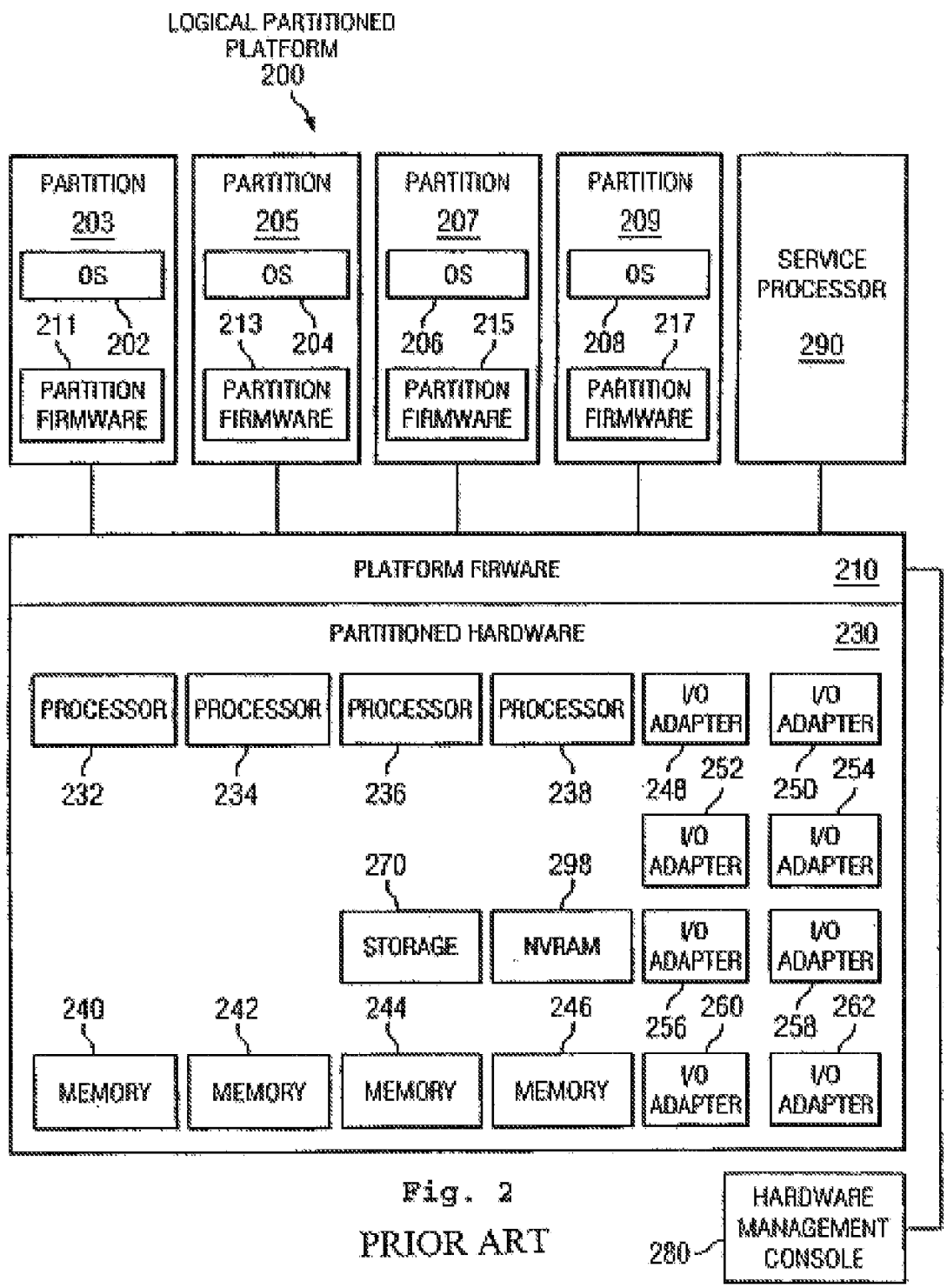
FIG. 2 is a block diagram of an exemplary logical partitioned platform in which the present invention may be implemented.

With reference now to FIG. 2, a block diagram of an exemplary logically partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware such as Hypervisor. OS/400 is used only as an example in these illustrative embodiments. Other types of operating systems, such as AIX and Linux, may also be used depending on the particular implementation. Operating systems 202, 204, 206, and 208 are located in partitions 203, 205, 207, and 209. Hypervisor is an example software product that may be used to implement partition management firmware 210 and is available from International Business Machines Corporation. Firmware is program code stored in nonvolatile memory, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. These may be implemented using initial boot strap code, IEEE-1275 Standard Open Firmware, and runtime abstraction software ("RTAS"), which is available from International Business Machines Corporation. When partitions 203, 205, 207, and 209 are instantiated, a copy of boot strap code is loaded onto them by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, and a storage unit 270. Each of the processors 232-238, memory units 240-246, NVRAM storage 298, and IOAs 248-262, or parts thereof, may be assigned to one of the multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In an LPAR environment, it is not permissible for resources or programs in one partition to affect operations in another partition. Furthermore, to be useful, the assignment of resources needs to be fine-grained. For example, it is often not acceptable to assign all IOAs under a particular PHB to the same partition, as that will restrict configurability of the system, including the ability to dynamically move resources between partitions.

Accordingly, some functionality is needed in the bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

A number of such functionalities are known in the art, and for example, several procedures for isolating input/output addressing are described in U.S. patent application publication No. 2006/0010276. Such functionalities, however, have not heretofore been available for a data processing system utilizing HyperTransport technology, which, as mentioned above, is a communication technology for coupling relative small groups of devices.

Figure 3:
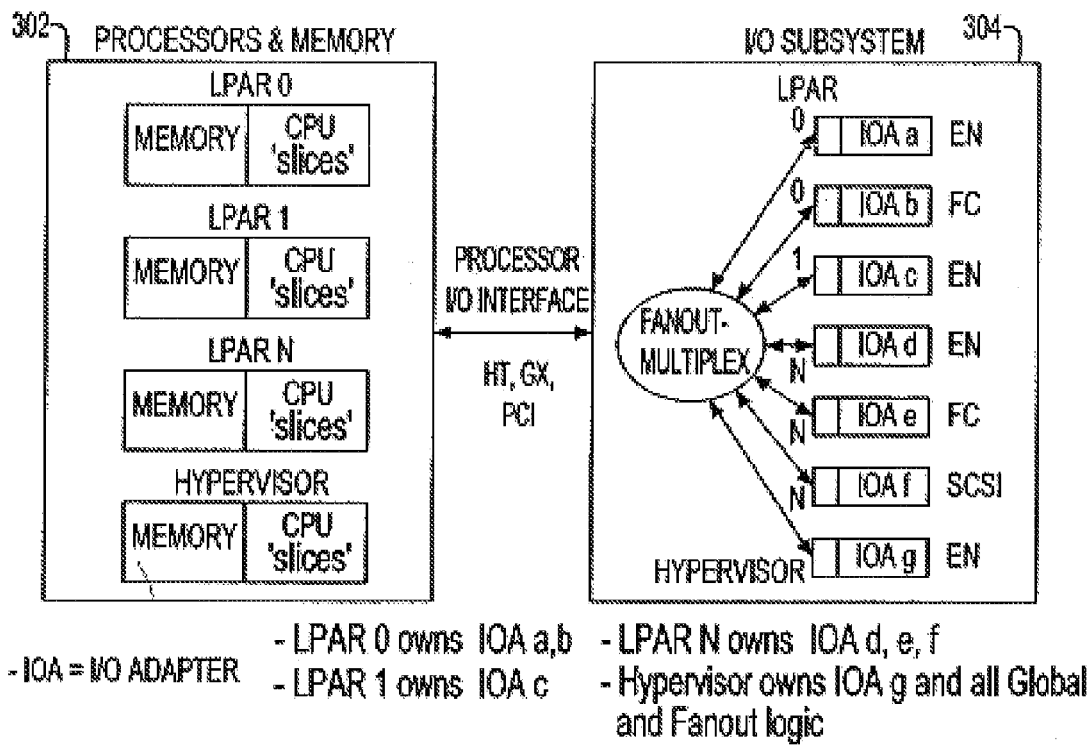
FIG. 3 is a logical view of LPAR for I/O

FIG. 3 shows a logical view of LPAR for I/O. In particular, in the logical view of FIG. 3, processors and memory are shown at 302, and the I/O subsystem is shown at 304. Logical partitioning, as mentioned above, allocates processor and memory resources to multiple, independent system images (LPARs), each capable of running an independent operating system. Each LPAR is logically isolated from all other LPARs, and one LPAR is not allowed to directly access another LPAR's memory. All memory addresses generated by IOAs must be verified and/or translated to ensure they access only allowed memory addresses.

One LPAR is not allowed to directly access another LPAR's IOAs, and MMIO space access is controlled via TLB mechanisms on 4K page boundaries. Also, one LPAR cannot cause an IOA to send interrupts to another LPAR, and errors caused by IOAs owned by one LPAR cannot be allowed to affect another LPAR. Communication between LPARs uses normal inter-processor communication ("IPC") methods or the Hypervisor, and communications between IOAs (peer-to-peer) is not allowed.

The Hypervisor is a special trusted image and performs a number of important functions. The Hypervisor controls the access of all resources (processors, memory, and IOAs) to the LPARs; and the hypervisor controls all global logic, multiplexors, fanout, switches, real time memory address registers, memory address translation tables, etc.

I/O operations may be performed by the Hypervisor on behalf of the LPARs. This requires Hypervisor routines such as hCalls, data copies, and interrupt routing. For example, as shown in FIG. 3, the hypervisor image owns IOA g. High performance I/O allocates IOAs to LPARs; and, for instance as shown in FIG. 3, LPAR 0 owns IOAs a and b, and LPAR 1 owns IOA c.

Figure 4:
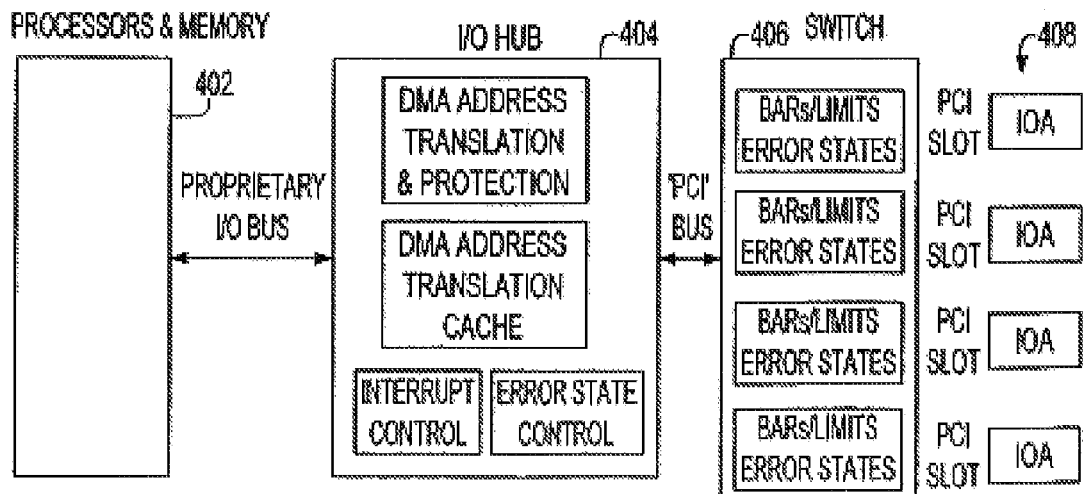
FIG. 4 illustrates a present slot identification arrangement.

FIG. 4 shows a slot identification arrangement. In the view of FIG. 4, processors and memory are shown at 402, an I/O hub is shown at 404, a series of switches are shown at 406, and a group of IOAs are shown at 408. With this arrangement, each PCI slot and the attached IOAs are owned by a single LPAR. The switch includes isolation logic based on address ranges (BAR/Limit). With the arrangement shown in FIG. 4, the I/O hub and the processors do not isolate the IOAs.

Figure 5:
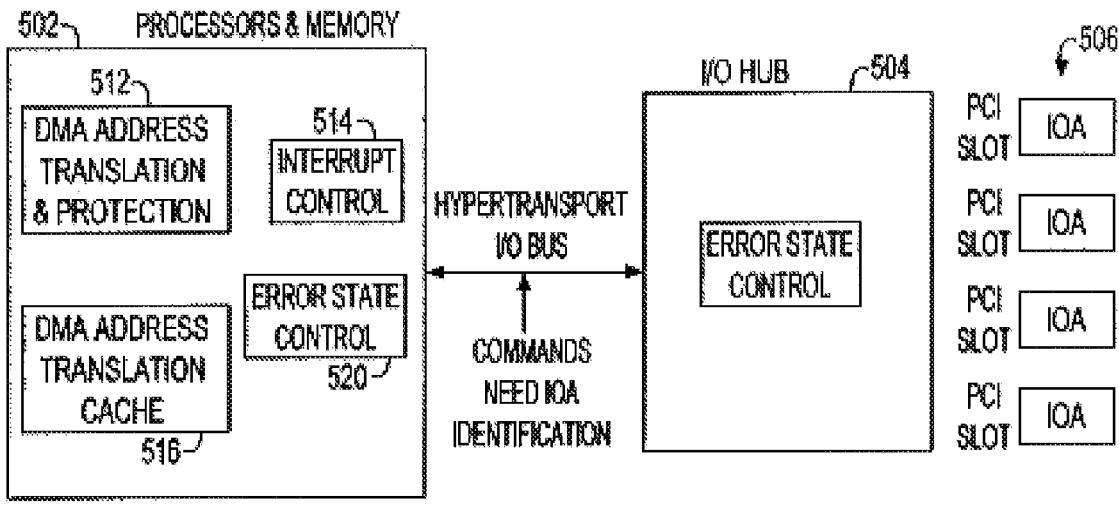
FIG. 5 shows an arrangement in which isolation Functions are moved towards the processor.

Also shown in FIG. 4 are physical (PCI) slots. In contrast, the present invention uses "Slot IDs." As illustrated in FIG. 5, this arrangement, compared with FIG. 4, moves isolation functions closer to the processor. In particular, processors and memory are shown at 502, an I/O hub is shown at 504, and a group of IOAs are shown at 506. DMA address translation and protection 512, interrupt control 514, DMA address translation cache 516, and error state control 520 are performed by the processor, rather than the I/O hub. Here too, though, each PCI slot and its attached IOA are owned by a single LPAR. The arrangement of FIG. 5 requires minimal isolation logic in the north/south bridges.

With the present TVT design which includes Translation Validation Entries ("TVEs"), DMA and interrupt, PCI address ranges are still used as the primary isolation method. Some higher order bits of the PCI address are used as an index into the TVT to extract a TVE. The TVE includes a Req ID ("bus/dev/func") field that can be compared to the requesting IOAs Req ID. If the Req ID compare is valid, the Translation base Address Registers (TAR) in the Translation Validation Entry ("TVE") is used to find the translation element in system memory (or in a translation element cache).

Figure 6:
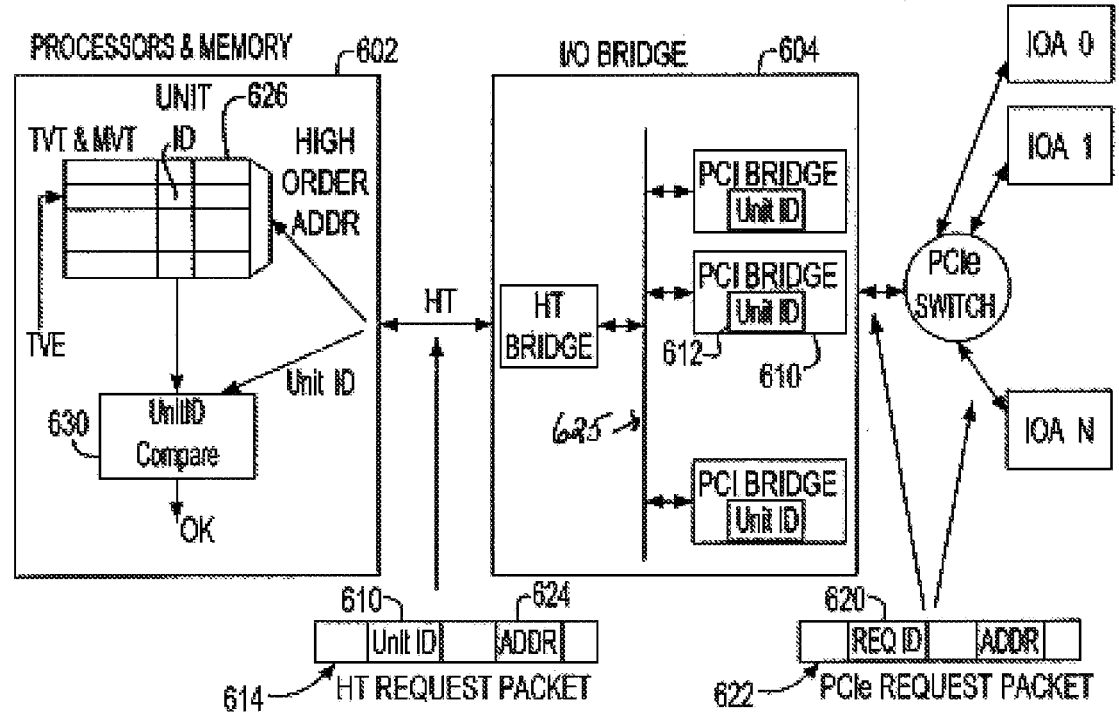
FIG. 6 shows DMA/MSI access control in a HyperTransport environment.

In accordance with a preferred embodiment of the present invention, IOAs are identified by the HyperTransport Unit ID field, which is five bits. FIG. 6 illustrates this access control in an HT environment. In the view of FIG. 6, processors and memory are shown at 602, an I/O bridge is shown at 604, and a group of IOAs are shown at 606. Each PCI Bridge 610 in the I/O Bridge 604 has one UnitID 612, and all IOAs under a PCI Bridge are owned by a single LPAR. The UnitID is inserted into HT requests 614, and the REQ ID 620 in the PCIe request 622. The REQ ID is a 16 bit field as follows: Bus (8), Device (5), Function (3) ("Bus/dev/func"). Also, the REQ ID 620 from a PCIe request 622 is stored in the PCI Bridge and returned to the IOA in the PCIe Completion step.

In operation, the IOA generates a PCIe Request 622 (DMA Read or Write), and the PCI Bridge stores the REQ ID and generates HT commands to satisfy the PCIe Request. The PCI Bridge inserts its UnitID in the HT Requests it generates, transmits it over the logical bus 625 to the HT bridge and then over the HT link, and the Processor receives the HT Request and uses some of the high order bits in the Address field 624 as an index into the TVT 626. Each TVE includes a UnitID, and the Unit IDs from the TVE and HT Request 614 are compared at 630. If these unit IDs are equal, the test passes and the request is processed. The HT Response is then sent back from the Processor to the PCI Bridge. The UnitID routes the response to the appropriate PCI Bridge, and, in the PCIe Completion, the PCI Bridge inserts the REQ ID into the PCIe Response packet(s) sent to the requesting IOA.

Figure 7:
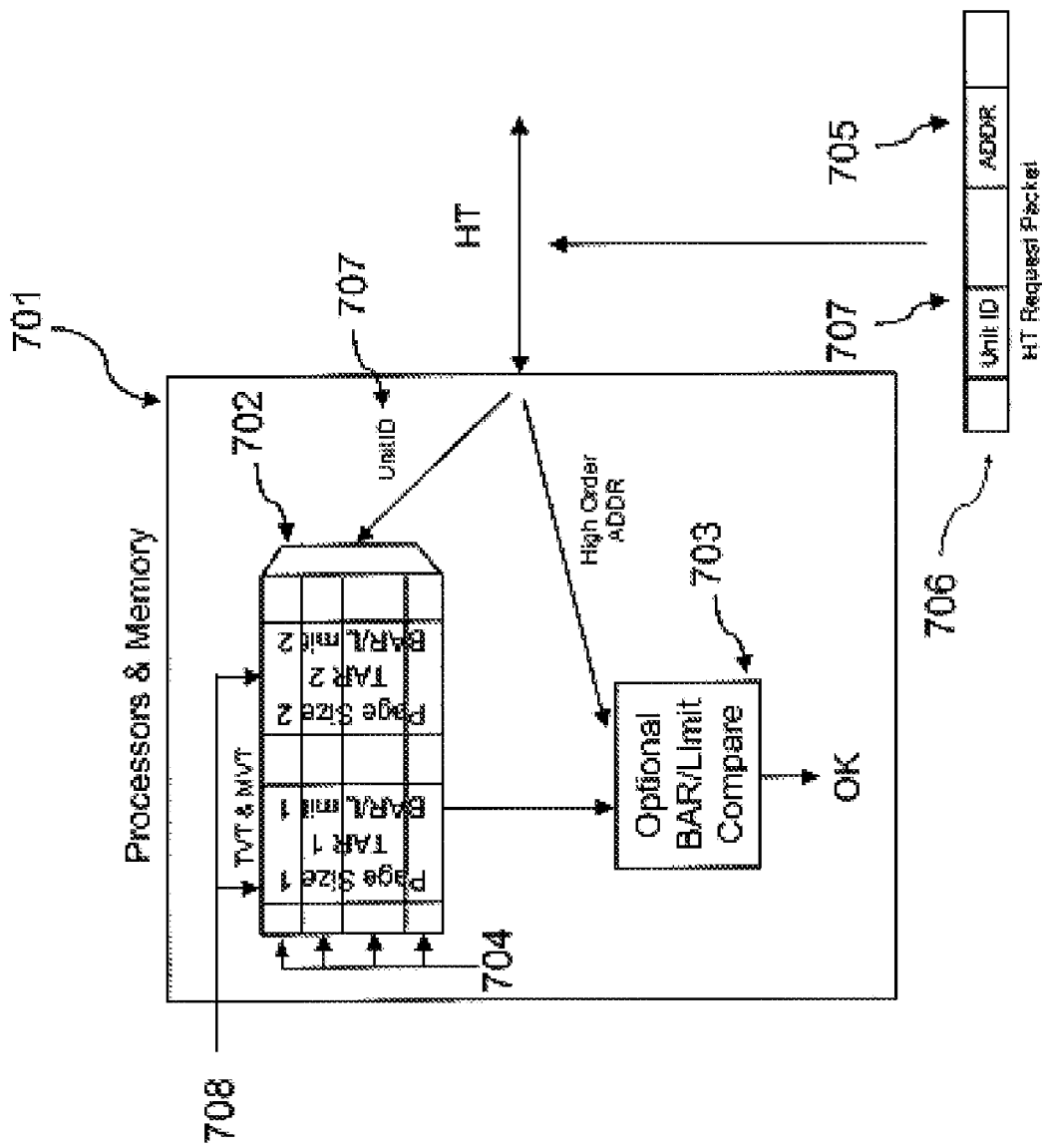
FIG. 7 shows an alternate TVT implementation using the Unit ID as an index into the TVT.

With reference to FIG. 7, in accordance with a preferred embodiment of the present invention, several features are provided or continued from the previous embodiments described above: the UnitID 707 is used as the index into the TVT 702 rather than the higher order address bits; each UnitID (and each IOA) points to its own TCE table (the TAR—TCE Address Register); each IOA has complete ownership of the entire address space-up to the full 64 bits; note that using high order address bits as the TVT index restricts the use of the address space; with no need to use high order address bits as the index into the TVT, 40 bit HT mode can be more effectively used and this eliminates the overhead of the HT defined prepended address extension header; an optional base address register (BAR)/Limit compare 703 restricts the addresses available to the IOA, if required, as a further verification similar to the compare verification step described above, except that the BAR/Limit is used in the comparison step; and Multiple Page Size Support is available, but not necessary, through multiple TAR limits and BAR/Limit combinations 708 for each Unit ID.

In operation, the IOA generates a PCIe Request 622 (DMA Read or Write), and the PCI Bridge stores the REQ ID and generates HT commands to satisfy the PCIe Request. The PCI Bridge inserts its UnitID in the HT Requests it generates all as described above, however, in this implementation the Processor receives the HT Request 706 and uses the Unit ID 707 as an index into the TVT 702. The request is then processed if the optional BAR/Limit compare is not implemented. HT includes a mode wherein an address can be 40 bits. This 40 bit mode can be advantageous in saving bus cycles but cannot be implemented when the higher order address bits are necessary to index the TVT. Each TVT entry 704 includes a Base Address/Limit range and the BAR/Limit from the TVT and HT Request 706 are compared at 703. This is an optional comparison step as described above. If these address values compare, when the optional compare is implemented, the test passes and the request is processed. After processing the request, the HT Response is then sent back from the Processor to the PCI Bridge. The UnitID routes the response to the appropriate PCI Bridge, and, in the PCIe Completion, the PCI Bridge inserts the REQ ID into the PCIe Response packet(s) sent to the requesting IOA.

Figure 8:
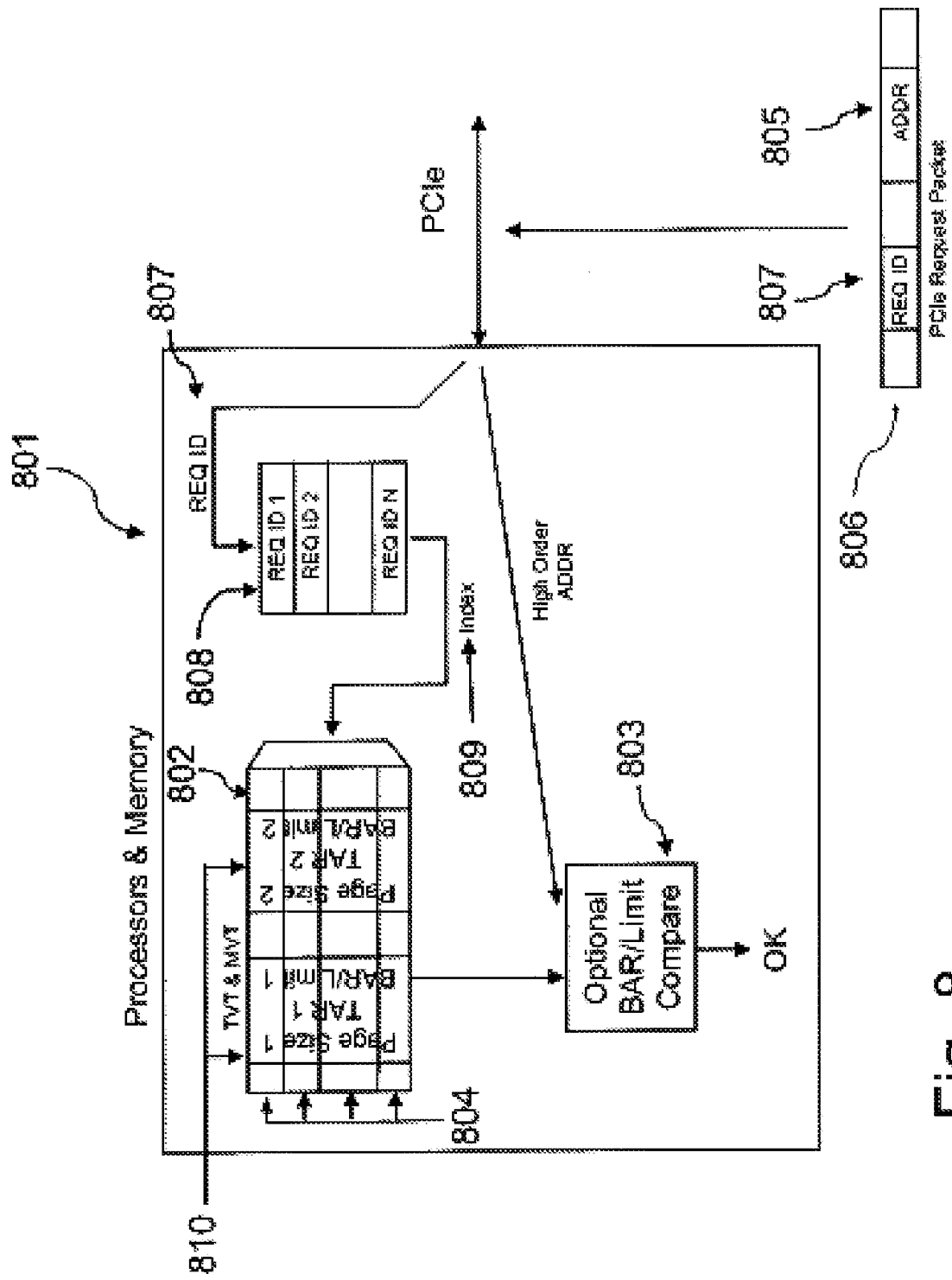
FIG. 8 shows an alternate TVT implementation using the PCIe Req ID as an input into a CAM.

With reference to FIG. 8, in accordance with a preferred embodiment of the present invention, several features are provided or continued from the embodiments described above: using the PCIe REQ ID 807 as the input into a content addressable memory (CAM) 808; the index provided from the CAM 809 indexes into the TVT 802; each IOA points to its own translation control element (TCE) table (the TAR—TCE Address Register); each IOA has complete ownership of the entire address space, up to the full 64 bits; note that using high order address bits as the TVT index restricts the use of the address space; an optional base address register (BAR)/Limit compare 803 restricts the addresses available to the IOA, if required, as a further verification similar to the compare verification step described above, except that the BAR/Limit is used in the comparison step; and Multiple Page Size Support is available, but not necessary, through multiple TAR limits and BAR/Limit combinations 810.

In operation, the IOA, as described above, generates a PCIe Request 622 (DMA Read or Write), however, in this implementation the Processor receives the PCIe request packet 806 and uses its Req ID 807 as an index into the CAM 808 which identifies an index 809 into the TVT 802. The request is then processed if the optional BAR/Limit compare is not implemented. Each TVT entry 804 includes a Base Address/Limit range and the BAR/Limit from the TVT and PCIe request 806 are compared at 803. This is an optional comparison step as described above. If these address values compare, when the optional compare is implemented, the test passes and the request is processed. After processing the request, the PCI Response is then sent back from the Processor to the PCIe switch. The Req ID routes the response to the requesting IOA.

It should be noted that the present invention, or aspects of the invention, can be embodied in a computer program product, which comprises features enabling the implementation of methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. For the purposes of this description, a computer program product or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of isolating a plurality of I/O adapter units of a data processing system, said data processing system comprising a set of processors, content addressable memory (CAM), and a translation validation table (TVT), said method comprising:

the processors assigning to each of the I/O adapter units a respective identifier;

the I/O adapter units sending memory requests to the set of processors, each request including said respective identifier;

the processors indexing in the TVT a memory space requested by said each request based on an index value provided by the CAM in response to the respective identifier; and the processors using the respective identifier as an index into the TVT pointing to translation validation entries (TVE) containing a translation address register (TAR) comprising a base address to identify a unique and independent memory space in system memory associated with the one of I/O adapter units.

2. The method according to claim 1, further comprising the step of the processors sending a response packet including the respective identifier for identifying a requesting I/O adapter unit.

3. The method according to claim 1, further comprising the step of the set of processors using the respective identifier as an index into said CAM to generate an index value and to use the index value as an index into the TVT to identify one of the I/O adapter units.

4. The method according to claim 1 further comprising the step of, wherein the set of processors include a plurality of logical partitions, assigning each of the plurality of I/O adapter units, on the basis of its respective identifier, to a different one of said partitions.

5. The method according to claim 4, further comprising the step of verifying that the memory space requested by said one of the I/O adapter units is in its assigned logical partition.

6. The method according to claim 5, wherein the step of verifying further comprises the step of comparing an address limit value with address bits associated with said one of the I/O adapter units.

7. The method according to claim 6, wherein the address bits comprise higher order address bits associated with said one of the I/O adapter units for restricting use of the memory space by said one of the I/O adapter units.

* * * * *